No. 622,164. Patented Mar. 28, 1899.
C. A. PFENNING.
FASTENING FOR GLOVES.
(Application filed Sept. 23, 1897.)
(No Model.)
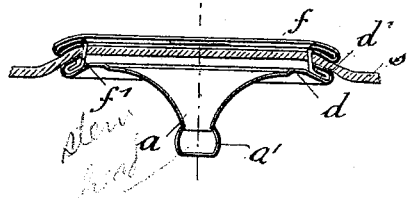
Fig. 1.
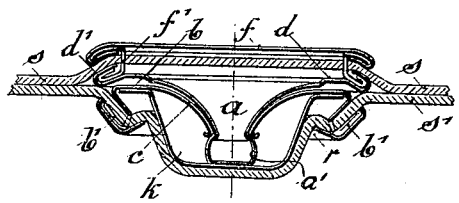
Fig. 6.
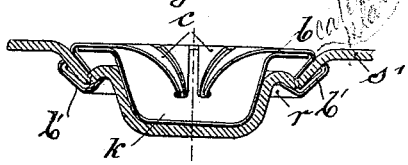
Fig. 2.
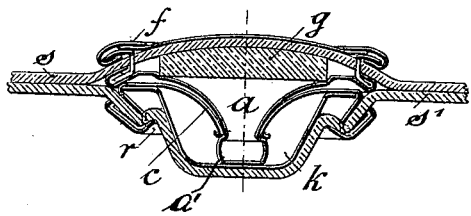
Fig. 7.
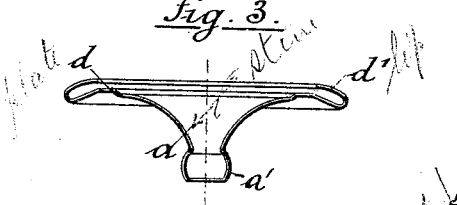
Fig. 3.
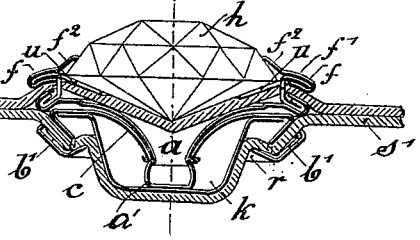
Fig. 8.
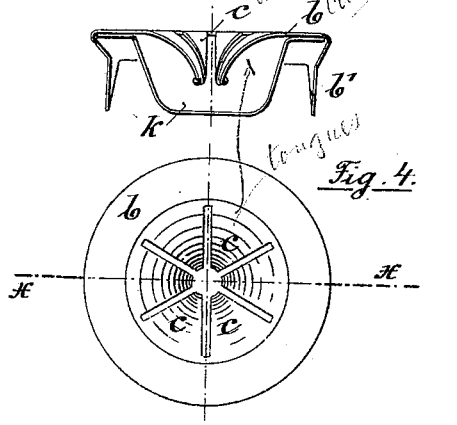
Fig. 5.
Fig. 4.
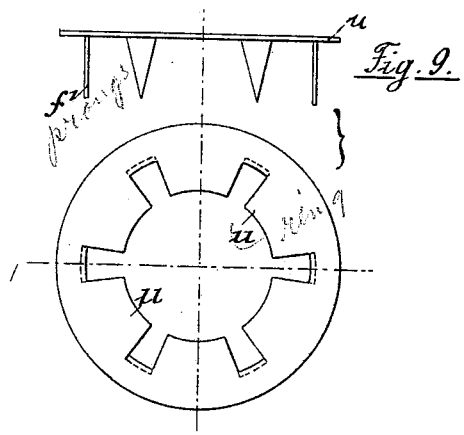
Fig. 9.
Witnesses:
Inventor:

UNITED STATES PATENT OFFICE.

CARL AUGUST PFENNING, OF BARMEN, GERMANY.

FASTENING FOR GLOVES.

SPECIFICATION forming part of Letters Patent No. 622,164, dated March 28, 1899.

Application filed September 23, 1897. Serial No. 652,768. (No model.)

*To all whom it may concern:*

Be it known that I, CARL AUGUST PFENNING, a subject of the King of Prussia, Emperor of Germany, residing at Barmen-Rittershausen, in the Province of Rhenish Prussia, Kingdom of Prussia, Germany, have invented new and useful Improvements in Fastenings for Gloves, Boots, and the Like, of which the following is a specification.

This fastening comprises members or parts, one of which is provided with a head or headed stud, the other member comprising a catch-plate having an opening formed by radially-projecting resilient tongue-pieces bent or made to correspond to the form of the stem and having rounded ends which grip behind the head of the stem or stud and lie closely there against.

This fastening is illustrated on enlarged scale in the annexed drawings, in which—

Figure 1 is a vertical section of one fastener member. Fig. 2 is a like section of the counterpart or member of Fig. 1. Fig. 3 shows the stem or stud member of the fastening. Fig. 4 is a plan view of the catch-plate. Fig. 5 is a section along line $x\,x$, Fig. 4. Fig. 6 is a sectional view of the fastening closed. Figs. 7 and 8 are sectional views of modifications. Fig. 9 shows detail edge and plan views of a part of the fastening shown in Figs. 1 to 8.

$a$ is the stem, having a flat thickened head $a'$.

$b$ is the catch-plate, formed with radially-projecting resilient tongue-pieces $c$.

The stem $a$ and the catch-plate $b$ can be applied to the respective halves or members of the fastening in various ways. The stem or stud may, for instance, be formed hollow, having thus the advantage of cheapness and lightness. Such stud can be formed from a plate $d$, Fig. 3, having a lip $d'$, turned inward, so that by means of a ring $u$, having prongs $f'$, puncturing the material or one of the flaps of the article to be fastened and bent under the lip $d'$, said stud is connected to the cover-plate $f$. The cover-plate may be formed with a central opening, as shown in Fig. 7, in which case the material comes to view, and may be covered with a celluloid or other plate let into the cover-plate $f$. By the insertion of a pasteboard pad $g$ a corresponding curvature is attained, or the cover-plate $f$ may be formed with prongs $f^2$, as shown in Fig. 8, for mounting a brilliant $h$, resting on the ring $u$, provided with the prongs $f'$, Fig. 9, said ring engaging the cover-plate $f$. In order to secure the catch-plate, the latter is likewise provided on its rim with prongs $b'$, Fig. 2, which are bent around the correspondingly-formed ring $r$ on the other side of the flap or material, thus firmly securing the catch-plate to the flap. A cap $k$ is provided to inclose the tongue-pieces $c$.

The construction with simple flat cover-plate for the upper member, Figs. 1 and 6, is well suited as fastening for umbrella-bands, since by reason of there being no projecting parts accidental opening is obviated.

As the radial tongue-pieces $c$ in consequence of their being out of the plate $b$ are particularly resilient and since the enlargement of the head is comparatively small, the pressing in of the latter is effected with great ease, so that the part of the body or person of the wearer coming under the fastening experiences only a very slight pressure. In spite of this easy closing the fastening is thoroughly reliable, the tongue-pieces gripping behind the enlarged head and not permitting of an opening by accident. Opening of the fastening by drawing out the stem can nevertheless be conveniently and easily effected, as the points of the tongue-pieces are slightly rounded at their ends, thus offering but little resistance to the head of the stem when the latter is drawn out in vertical direction. The arrangement has the further advantage that in the closed position the two halves sit closely together—*i. e.*, there is no free play between them in any direction—and the flattened head $a'$ rests upon the bottom of cap $k$, so that a lateral inclination or displacement of the stem, and thereby an opening of the fastening of itself or by a slight movement, with consequent disagreeable or painful pressure of the edge of the fastening into the flesh of the arm or wrist, is avoided.

I do not herein claim anything shown in my application, Serial No. 634,460, on which United States Patent No. 603,202 has been issued April 26, 1898.

What I claim as new, and desire to secure by Letters Patent, is—

A fastening having one of it members provided with a stem or stud having a flat thickened head and a flaring or bell-shaped body portion, and its other member provided with a catch-plate secured at its edge and having its opening formed by radial spring-tongues bent to correspond to the form of the stud, a cap secured to said catch-plate and inclosing said tongues, said tongues having rounded ends made to catch under the head of the stud and being adapted to embrace snugly said flaring body portion, the flat head of the stud being adapted to engage the bottom of said cap to prevent leverage, whereby the stud may be easily pressed into the socket to locking position and be securely held therein without allowing play or looseness between, or tilting of, the fastening members, substantially as described.

In testimony whereof I have hereunto set my hand in the presence of two subscribing witnesses.

CARL AUGUST PFENNING.

Witnesses:
   OTTO KÖNIG,
   FRANZ HÖLBEIN.